US009825895B2

(12) United States Patent
Ando

(10) Patent No.: US 9,825,895 B2
(45) Date of Patent: Nov. 21, 2017

(54) METHOD AND SYSTEM FOR EXCHANGING MESSAGES ON THE BASIS OF CURRENT POSITION

(71) Applicant: TAP AROUND INC., Warabi, Saitama (JP)

(72) Inventor: Yuta Ando, Saitama (JP)

(73) Assignee: Tap Around Inc., Saitama (JP)

(*) Notice: Subject to any disclaimer, the term of this patent is extended or adjusted under 35 U.S.C. 154(b) by 62 days.

(21) Appl. No.: 14/898,642

(22) PCT Filed: Jul. 15, 2014

(86) PCT No.: PCT/JP2014/068768
§ 371 (c)(1),
(2) Date: Dec. 15, 2015

(87) PCT Pub. No.: WO2015/012152
PCT Pub. Date: Jan. 29, 2015

(65) Prior Publication Data
US 2016/0142357 A1 May 19, 2016

(30) Foreign Application Priority Data

Jul. 21, 2013 (JP) .................................. 2013-151205

(51) Int. Cl.
*H04W 4/00* (2009.01)
*H04L 12/58* (2006.01)
(Continued)

(52) U.S. Cl.
CPC ............ *H04L 51/20* (2013.01); *H04L 5/0048* (2013.01); *H04L 51/32* (2013.01);
(Continued)

(58) Field of Classification Search
CPC ..... H04L 51/20; H04L 61/6022; H04L 67/02; H04L 5/0048; H04L 67/18; H04L 51/32; H04L 51/38; H04W 60/00; H04W 84/12
USPC .......................................................... 370/329
See application file for complete search history.

(56) References Cited

U.S. PATENT DOCUMENTS

2005/0101341 A1* 5/2005 Ogata .................... H04W 48/20
455/525
2006/0268743 A1* 11/2006 Yoshida ................. H04W 48/10
370/254
(Continued)

FOREIGN PATENT DOCUMENTS

JP 2005-027239 A 1/2005
JP 2009-089003 A 4/2009
(Continued)

OTHER PUBLICATIONS

Extended European search report dated Feb. 22, 2017, issued in the counterpart EP Patent Application 14829478.8.

*Primary Examiner* — Faisal Choudhury
(74) *Attorney, Agent, or Firm* — Carrier Blackman & Associates, P.C.; Joseph P. Carrier; Jingli Wang

(57) ABSTRACT

Provided is a method for exchanging messages only between the users in a predetermined range around the current position, without intentionally grouping the users. A message server stores a message table where a message is associated with each set of addresses of a plurality of access points. A portable terminal searches for access points near the portable terminal and receives annunciation signal including the address of the access point from each access point. The portable terminal transmits, to a message server, a message acquisition request including, as a query, the set of the addresses included in the annunciation signals. The message server compares the set of the addresses as the query with a plurality of sets of addresses recorded in the message table, extracts messages corresponding to the sets of the addresses ranking high arranged in descending order of similarity, and transmits the messages to the portable terminal.

21 Claims, 10 Drawing Sheets

(51) Int. Cl.
  *H04L 29/12*    (2006.01)
  *H04L 5/00*     (2006.01)
  *H04L 29/08*    (2006.01)
  *H04W 60/00*    (2009.01)
  *H04W 84/12*    (2009.01)

(52) U.S. Cl.
  CPC .......... *H04L 61/6022* (2013.01); *H04L 67/02* (2013.01); *H04L 67/18* (2013.01); *H04W 60/00* (2013.01); *H04L 51/38* (2013.01); *H04W 84/12* (2013.01)

(56) References Cited

U.S. PATENT DOCUMENTS

| | | |
|---|---|---|
| 2007/0030824 A1 | 2/2007 | Ribaudo et al. |
| 2007/0070936 A1* | 3/2007 | Stamoulis ............ H04W 74/04 370/328 |
| 2007/0281689 A1 | 12/2007 | Altman et al. |
| 2009/0248807 A1 | 10/2009 | Fron et al. |
| 2011/0045842 A1 | 2/2011 | Rork et al. |
| 2013/0100819 A1* | 4/2013 | Anchan ................ H04W 48/20 370/241 |
| 2013/0316705 A1* | 11/2013 | Kneckt .................. H04L 67/16 455/435.1 |

FOREIGN PATENT DOCUMENTS

| | | |
|---|---|---|
| JP | 2009-188922 A | 8/2009 |
| JP | 2010-177876 A | 8/2010 |
| JP | 2011-239441 A | 11/2011 |
| JP | 2013-003659 A | 1/2013 |

* cited by examiner

METHOD AND SYSTEM FOR EXCHANGING MESSAGES ON THE BASIS OF CURRENT POSITION

This application claims under the Paris Convention the benefit of the priority of Japanese Patent Application No. 2013-151205 filed on Jul. 21, 2013, which is hereby incorporated by reference in its entirety for the purposes of PCT Rule 20.6.

TECHNICAL FIELD

The present invention relates to a technique for a message exchange service which is typified by a mini Web log or a social networking service (SNS).

BACKGROUND ART

In recent years, a mini Web log or SNS, such as Facebook (registered trademark) or Twitter (registered trademark), has come into widespread use and comments or sentences have been transmitted and received to and from an unspecified number of the general public. A user can transmit messages from the user's terminal to a corresponding message server and can browse desired messages from other users. In addition, the user can browse only comments or sentences related to desired topics. In particular, the retweet function of Twitter has strong force to spread, for example, comments between the users. The number of characters in a Twitter message is limited to 140. However, the Twitter messages are the important advertisement media of each company or store and the companies or stores can attract the users who have browsed the messages to the site pages of their Web servers.

In addition, there is a technique that distributes advertisement information on the basis of the current position of the terminal. For example, Patent Document 1 discloses a technique in which a terminal receives a beacon signal transmitted from an access point, stores the history of a service set identifier (SSID) included in the beacon signal, transmits the history to a server, and receives advertisement information associated with the SSID from the server.

Patent Document 2 discloses a technique in which a base station transmits a beacon signal including the address of a server and the identifier of the base station and a terminal receives the beacon signal and transmits a message acquisition request including the identifier of the base station to the address of the server to acquire information about content distributed by the base station.

Patent Document 3 discloses a technique in which a server stores area information corresponding to the position, an access point has area identification information, and a wireless terminal transmits a request signal including the position identification information acquired from the access point to the server to acquire the area information.

CITATION LIST

Patent Document

Patent Document 1: JP 2009-188922 A
Patent Document 2: JP 2009-089003 A
Patent Document 3: JP 2005-027239 A

DISCLOSURE OF THE INVENTION

Problem to be Solved by the Invention

In a system using a general message server, the users form a group using the relationship between follows and followers and messages are transmitted and browsed in the group. The relationship between follows and followers is established between the request and approval of the user and regionality is not related to the establishment of the relationship. That is, the distance between the terminals which transmit and receive messages does not limit the establishment of the relationship between follows and followers.

In contrast, the inventors considered a technique which could form a group in which messages are transmitted and browsed on the basis of a loose relationship such as regionality. Specifically, a given user wants that the message to be transmitted should be browsed only by other users who stay in an area around the current position of the user's terminal. For example, small local stores desire that the messages or websites thereof should be browsed only by persons who stay in the area. On the other hand, another user wants to browse only the messages transmitted from other users who stay in the area around the current position of the user's terminal. For example, when the user uses restaurants or fresh food stores, the user needs to actually visit the stores. Therefore, the messages of the stores are less likely to be wanted by those who are far away.

However, in order for the users who stay in a predetermined area range to transmit or browse messages between each other, the message server needs to recognize the current positions of all of the terminals and to group only the users who stay in the predetermined area range. This process causes a large load to be applied to the message server, which makes it difficult to apply the process to a message exchange server with a simple structure that is used in, for example, Twitter.

An object of the invention is to provide a method and system which can exchange messages only between the users who stay in a predetermined range with reference to the current position, without intentionally forming a group relationship between the users.

Means for Solving Problem

According to the invention, there is provided a message exchange method performed in a system including a plurality of access points that transmit annunciation signals including their addresses, a portable terminal that can be connected to a wide area network and receives the annunciation signals transmitted from the access points, and a message server that is connected to the wide area network and stores a message table in which a message is associated with each set of the addresses of the plurality of access points. In order for the portable terminal to acquire the message from the message server, the method includes: a first step of allowing the portable terminal to search for the access points in the vicinity of the portable terminal and to receive the annunciation signal including the address of the access point from each access point; a second step of allowing the portable terminal to transmit, to the message server, a message acquisition request which includes, as a query, the set of the addresses of the plurality of access points included in the annunciation signals; a third step of allowing the message server to compare the set of the addresses as the query which is included in the message acquisition request with a plurality of sets of addresses recorded in the message table and to extract a message corresponding to a set of the addresses which ranks high among the sets of the addresses that are arranged in descending order of similarity; and a fourth step of allowing the message server to transmit the extracted message as a response to the portable terminal.

According to an embodiment of the message exchange method of the invention, the message server may register an excluded address in advance. In the third step, the message server may use, as a query, a set of the addresses obtained by excluding the excluded address from the set of the addresses as the query which is included in the message acquisition request.

According to another embodiment of the message exchange method of the invention, in order to register a message based on a user in the message table of the message server, the message exchange method may further include: a step of allowing the portable terminal to search for the access points in the vicinity of the portable terminal and to receive the annunciation signal including the address of the access point from each access point; a step of allowing the portable terminal to transmit, to the message server, a message registration request including the set of the addresses of the plurality of access points included in the annunciation signals and the message based on the user; and a step of allowing the message server to register the set of the addresses and the message included in the message registration request in the message table.

In the above-mentioned embodiment, the message server may register an excluded address. In the step of registering the set of the addresses and the message, the message server may register, in the message table, a set of the addresses obtained by excluding the excluded address from the set of a plurality of addresses included in the message registration request.

According to still another embodiment of the message exchange method of the invention, in the third step, the message server may sort the extracted plurality of messages in descending order of the similarity.

According to yet another embodiment of the message exchange method of the invention, the message server may set the number of similarity determinations. In the third step, the message server may compare the set of the addresses as the query with the sets of the addresses recorded in the message table, use the number of matched addresses as the similarity, and extract a message corresponding to the set of the addresses in which the similarity is equal to or greater than the number of similarity determinations among the sets of the addresses which are arranged in descending order of the similarity.

According to yet still another embodiment of the message exchange method of the invention, in the message table, the number of similarity determinations may be set for each of the messages. In the third step, the message server may compare the set of the addresses as the query with the sets of the addresses recorded in the message table and extract only a message corresponding to the set of the addresses in which the number of matched addresses is equal to or greater than the number of similarity determinations.

According to still yet another embodiment of the message exchange method of the invention, the message server may set a degree of similarity determination. In the second step, the portable terminal may insert the set of the addresses of the plurality of access points which is sorted on the basis of a predetermined condition into the message acquisition request. In the third step, the message server may calculate similarity based on a difference in order between the set of the addresses as the query and the sets of the addresses recorded in the message table and extract a message corresponding to the set of the addresses in which the similarity is equal to or greater than the degree of similarity determination.

According to yet still another embodiment of the message exchange method of the invention, in the message table, a degree of similarity determination may be set for each of the messages. In the second step, the portable terminal may insert the set of the addresses of the plurality of access points which is sorted on the basis of a predetermined condition into the message acquisition request. In the third step, the message server may calculate similarity based on a difference in order between the set of the addresses as the query and the sets of the addresses recorded in the message table and extract only a message corresponding to the set of the addresses in which the similarity is equal to or greater than the degree of similarity determination.

In the two embodiments using the degree of similarity determination, the predetermined condition may be a reception level of the annunciation signal. In the third step, the message server may calculate similarity based on a difference in the reception level between the set of the addresses as the query and the sets of the addresses recorded in the message table and extract only a message corresponding to the set of the addresses in which the similarity is equal to or greater than the degree of similarity determination.

According to still yet another embodiment of the message exchange method of the invention, in the third step, after extracting the message, the message server may extract addresses which are not included in the set of the addresses as the query from a set of a plurality of addresses as the search result, select a set of at least one address from the extracted addresses, search for a set of a plurality of addresses recorded in the message table, using the selected set of addresses as the set of the addresses as the query, and extract a message corresponding to the searched set.

According to yet still another embodiment of the message exchange method of the invention, in the third step, when the message is extracted and a predetermined identifier and character string is added to the extracted message, the message server may search for a message including the character string using the message table and extract the message.

According to still yet another embodiment of the message exchange method of the invention, the address of the access point may be a media access control (MAC) address or a service set identifier (SSID).

According to yet still another embodiment of the message exchange method of the invention, the message may be a text message or media data, such as a uniform resource locator (URL), an image, video, audio, or sensor data, which is based on the user.

According to still yet another embodiment of the message exchange method of the invention, the annunciation signal may be a beacon signal or a probe response of a wireless local area network (LAN) which is transmitted from the access point, and a request and a response transmitted between the portable terminal and the message server may be based on a hypertext transport protocol (HTTP).

According to yet still another embodiment of the message exchange method of the invention, the system may further include a charging control server that is connected to the wide area network. The charging control server may manage account information about a publisher of the portable terminal which transmits a message registration request and account information about an operator of the message server. When receiving the message registration request, the message server may transmit, to the charging control server, a charging instruction request to instruct the transmission of information about a predetermined amount of money from the account information about the publisher of the portable terminal to the account information about the operator of the message server.

According to still yet another embodiment of the message exchange method of the invention, the system may further include a charging control server that is connected to the wide area network. The charging control server may manage account information about a publisher of the portable terminal which transmits a message registration request and account information about an operator of the message server. When receiving the message registration request, the message server may transmit, to the charging control server, a charging instruction request to instruct the transmission of information about a predetermined amount of money from the account information about the publisher of the portable terminal to the account information about the operator of the message server. As the number of similarity determinations set to each message decreases, the predetermined amount of money may increase.

According to yet still another embodiment of the message exchange method of the invention, the system may further include a charging control server that is connected to the wide area network. The charging control server may manage account information about a publisher of the portable terminal which transmits a message registration request and account information about an operator of the message server. When transmitting the message as a response, the message server may transmit, to the charging control server, a charging instruction request to instruct the transmission of information about a predetermined amount of money from the account information about the publisher of the portable terminal which has registered the message to the account information about the operator of the message server.

According to the invention, there is provided a message exchange system including: a plurality of access points that transmit annunciation signals including their addresses; a portable terminal that can be connected to a wide area network and receives the annunciation signals transmitted from the access points; and a message server that is connected to the wide area network and stores a message table in which a message is associated with each set of the addresses of the plurality of access points. In order to acquire the message from the message server, the portable terminal includes: an annunciation signal reception element that searches for the access points in the vicinity of the portable terminal and receives the annunciation signal including the address of the access point from each access point; a message acquisition request element that transmits, to the message server, a message acquisition request which includes, as a query, the set of the addresses of the plurality of access points included in the annunciation signals; and a message response reception element that receives the message from the message server and presents the message to a user. The message server includes: a message acquisition request reception element that receives the message acquisition request from the portable terminal; an address search element that compares the set of the addresses as the query which is included in the message acquisition request with a plurality of sets of addresses recorded in the message table and extracts a message corresponding to a set of the addresses which ranks high among the sets of the addresses that are arranged in descending order of similarity; and a message response transmission element that transmits the extracted message as a response to the portable terminal.

According to an embodiment of the message exchange system of the invention, in order to register a message based on the user in the message table of the message server, the portable terminal may further include a message registration request element that transmits, to the message server, a message registration request including the set of the addresses of the plurality of access points included in the annunciation signals and the message based on the user and the message server may further include a message registration element that registers the set of the addresses and the message included in the message registration request in the message table.

Effect of the Invention

According to the method and system of the invention, it is possible to exchange messages between the users who exist in a predetermined range with reference to the current position, without intentionally forming group relations between the users.

MODE(S) FOR CARRYING OUT THE INVENTION

Hereinafter, some exemplary embodiments of the invention will be described in detail with reference to the drawings.

Figure 1:
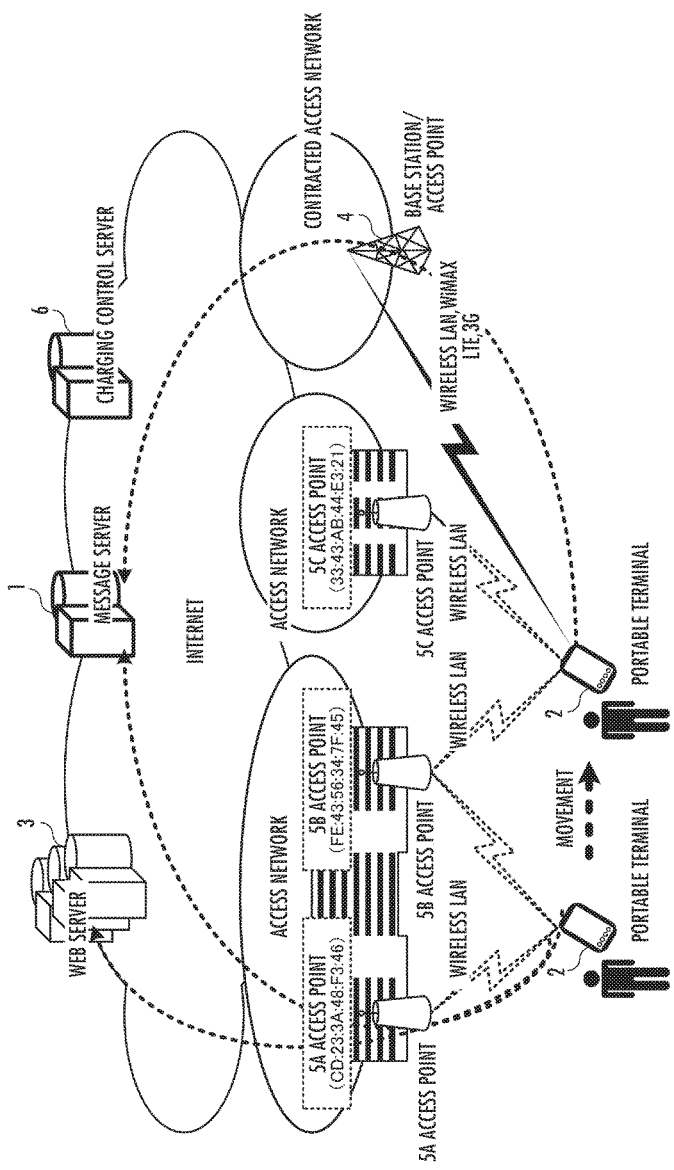
FIG. 1 is a diagram schematically illustrating an embodiment of a system according to the invention.

FIG. 1 is a diagram schematically illustrating an embodiment of a system according to the invention.

As illustrated in FIG. 1, the system includes access points 5 that transmit annunciation signals including their addresses and a portable terminal 2 that receives the annunciation signals transmitted from the access points 5 and can be connected to a wide area network such as the Internet. The system further includes a message server 1 that is connected to the wide area network.

In general, as the density of houses or stores in an area increases, the number of access points 5 installed in the area increases. Each access point 5 is connected to the Internet (wide area network) through an access network, such as an optical network, with which the access point 5 contracts individually.

As illustrated in FIG. 1, the portable terminal 2 stays at a position where it can receive a beacon signal (annunciation signal) of a wireless local area network (LAN) transmitted from each of the access points 5A to 5C that are installed in stores A, B, and C, respectively. The portable terminal 2 can be connected to the Internet through the access network with which the user of the portable terminal 2 contacts individually. The access network with which the portable terminal 2 contracts is not limited to the wireless LAN. For example, the access network may be a worldwide interoperability for microwave access (WiMAX) network, a long term evolution (LTE) network, or a 3rd generation (3G) network.

The user can search for neighboring access points using the portable terminal 2 to find a plurality of access points and select the access points of the access network with which the user contracts. Specifically, the portable terminal 2 can receive the annunciation signal including the address of the access point from each access point and check the annunciation signal to find the corresponding access point. For example, in the case of the wireless LAN, the annunciation signal is a beacon signal or a probe response. The portable terminal 2 can be connected to the access point (or a base station) of the contracted access network in response to an operation of the user. The portable terminal 2 is, for example, a smart phone or a tablet terminal and can access the message server 1 through the access network.

As illustrated in FIG. 1, a unique media access control (MAC) address and a service set identifier (SSID) which is given by the user are allocated to each of the access points 5A to 5C. In general, the user who operates the portable terminal 2 determines whether to perform connection to the access points on the basis of the acquired SSID.

The message server 1 is accessed by the portable terminal 2 held by the user. The transmission of a request and a response between the portable terminal and the message server is based on a hypertext transport protocol (HTTP). The message server 1 according to the invention stores a message table in which a message is associated with each set of the addresses of a plurality of access points, which will be described below with reference to FIG. 3.

As illustrated in FIG. 1, a charging control server 6 is also connected to the Internet. The charging control server 6 manages account information about a message publisher and account information about a message server operator. When the sequence according to the invention is performed, the charging control server 6 can create a business model in which the message publisher (storekeeper) pays a predetermined amount of money as an advertisement rate to the message server operator (a service provider according to the invention), which will be described below with reference to FIG. 9.

Figure 2:
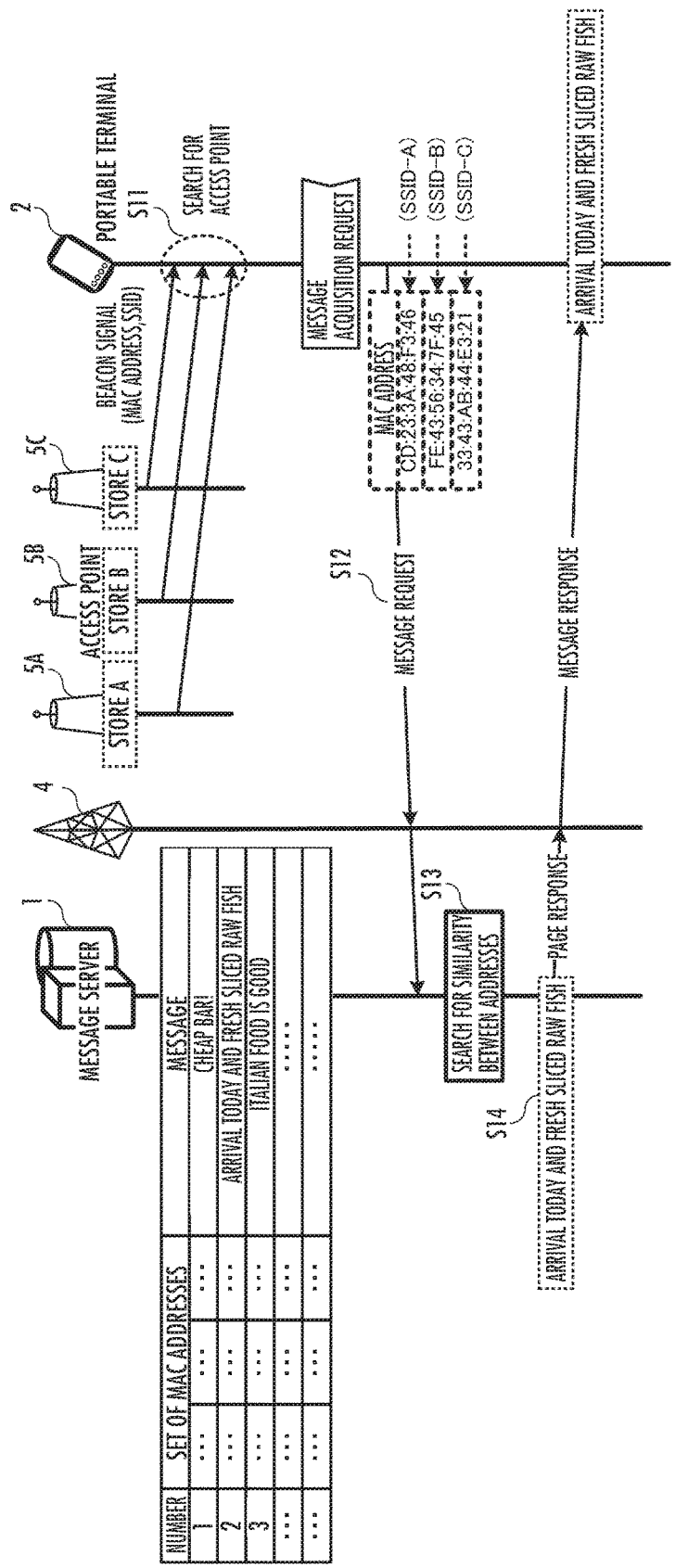
FIG. 2 is a sequence diagram illustrating an example of message acquisition according to the invention.

FIG. 2 is a sequence diagram illustrating an embodiment of message acquisition according to the invention.

(S11) First, the portable terminal 2 turns on a communication interface of the wireless LAN and searches for neighboring access points. The access points 5A to 5C installed in the stores A to C constantly broadcast the beacon signals including the MAC addresses and the SSIDs, which are their addresses, as the annunciation signals. The portable terminal 2 receives the beacon signals and recognizes that the access points 5A to 5C are present in the vicinity of the portable terminal 2.

Alternatively, the portable terminal 2 may broadcast a probe request to the vicinity of itself and receive probe responses from the access points which have received the probe request. In this case, the portable terminal 2 receives these probe responses and recognizes that the access points 5A to 5C are present in the vicinity of the portable terminal 2.

The access points 5A to 5C are not necessarily connected to the Internet through the access network. The access points 5A to 5C preferably transmit at least the beacon signal or the probe response. The access point is not a characteristic component of the invention and is just the existing component.

(S12) The portable terminal 2 transmits a "message acquisition request", which includes, as a query, a set of the addresses of a plurality of access points 5 included in the annunciation signals, to the message server 1. The set of the addresses is acquired by the beacon signals or the probe responses transmitted from the plurality of access points. Here, the address of the access point is a media access control (MAC) address or a service set identifier (SSID).

As illustrated in FIG. 2, three addresses of the access points 5A to 5C are included in the message acquisition request. However, the addresses are not the designation of the message acquisition request and are included in a data portion of the message acquisition request. The portable terminal 2 transmits the message acquisition request to the message server 1. Here, it is assumed that the portable terminal 2 has known the URL of the message server 1.

(S13) The message server 1 compares the set of the addresses as the query which is included in the message acquisition request with a plurality of sets of addresses recorded in the message table and extracts a message corresponding to a set of the addresses which ranks high among the sets of the addresses which are arranged in descending order of the similarity.

The message server 1 stores the following message table in which the sets of the addresses are associated with the messages:

| [Message Table] |
| --- |
| (MAC address) (MAC address) ... <-> (message) |
| (MAC address) (MAC address) ... <-> (message) |
| ........... |

For example, a message, such as "cheap bar!", "arrival today and fresh sliced raw fish", or "Italian food is good" is described for each set of the MAC addresses.

However, the message is not limited to the text message and may be media data, such as a uniform resource locator (URL), an image, video, audio, or sensor data.

The message server 1 acquires the set of the addresses as the query from the received message acquisition request.

[Set of Addresses in Query]

(MAC address) (MAC address) . . .

The two addresses are compared to extract the message corresponding to the set of the addresses which ranks high among the sets of the addresses which are arranged in descending order of the similarity. High similarity means that the distance between a portable terminal which transmits the message and a portable terminal which browses the message is short. Here, it is preferable that the message server 1 sort a plurality of extracted messages in descending order of the similarity. The user can browse the messages which are arranged in increasing order of a distance, with the message which is transmitted from the portable terminal closest to the user as the top.

However, in the message table, any of the MAC address and the SSID may be associated with the URL. However, the MAC address which is globally uniquely allocated is preferable. The reason is that, in some cases, the same SSID is allocated to different access points.

(S14) The message server 1 transmits the extracted message as a response to the portable terminal 2. Here, the message server 1 transmits a list of a plurality of messages as list information, which is an HTML source program, to the portable terminal 2. The HTML source program as the message list is included in a "page response", that is, a GET response based on the HTTP.

The portable terminal 2 is, for example, a smart phone or a tablet terminal and a WWW browser is installed in the portable terminal 2 in advance. Therefore, the portable terminal 2 can immediately render the message list received from the message server 1 and display the message list on the browser. Since the recent smart phones or tablet terminals have high arithmetic processing capability, an excessive load is not applied to the HTML source program generation process of the portable terminal 2. Finally, the user can browse only the messages which are transmitted from other users in an area around the current position of the terminal, that is, in an area having the current position as the center.

For example, the following four methods are used to extract the messages according to similarity.

Figure 3:
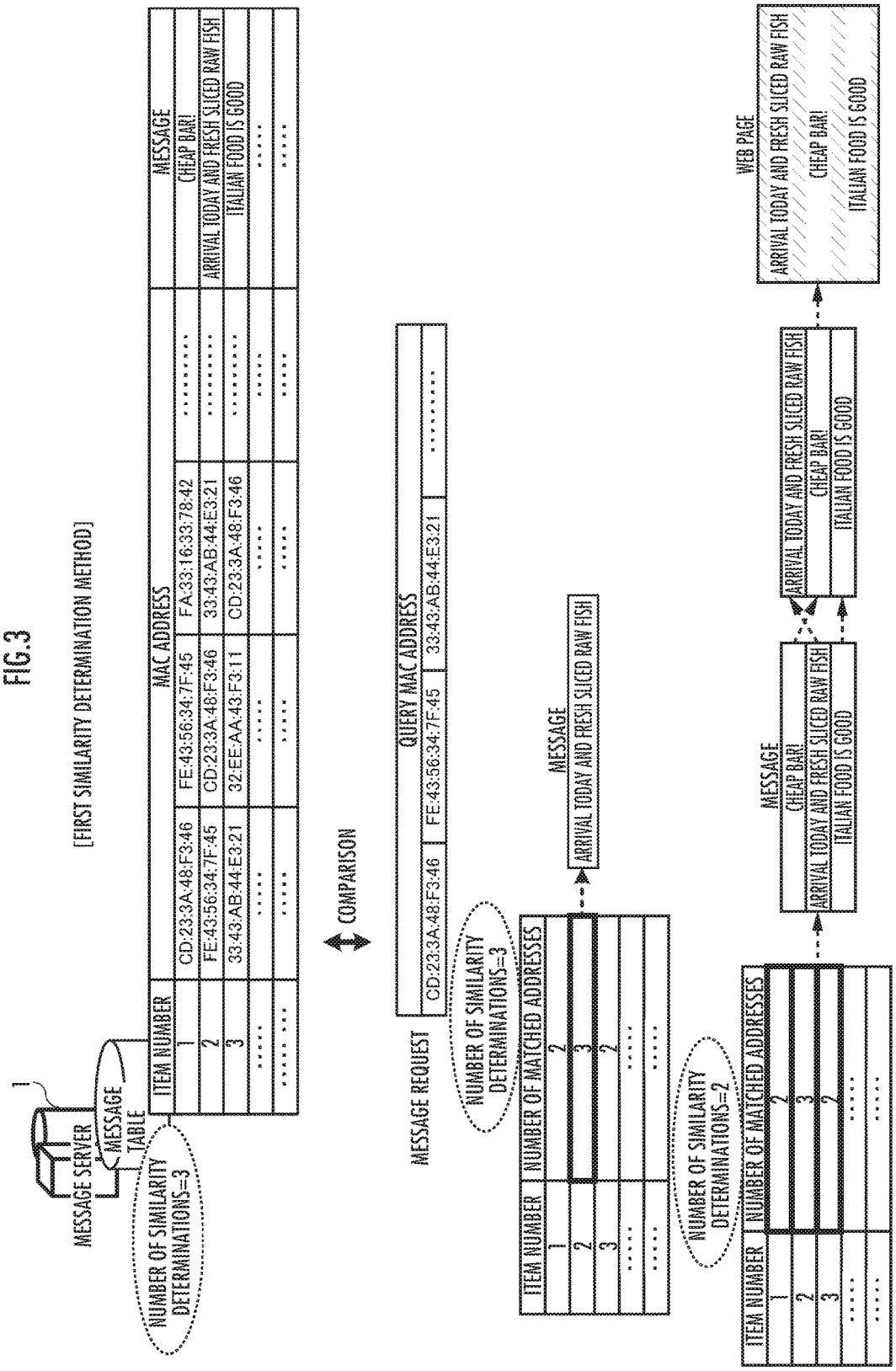
FIG. 3 is a diagram illustrating a first similarity determination method according to the invention.

FIG. 3 is a diagram illustrating a first similarity determination method according to the invention.

<First Similarity Determination Method>

The message server 1 sets the number of similarity determinations. Then, in the above-mentioned Step S13, the message server 1 compares the set of the addresses as the query with the sets of the addresses recorded in the message table, uses the number of matched addresses as similarity, and extracts the message corresponding to a set of the addresses in which the similarity is equal to or greater than the number of similarity determinations among the sets of the addresses which are arranged in descending order of the similarity.

In the first example illustrated in FIG. 3, the number of similarity determinations is set to 3. Here, in a row of item number 2, the number of matched addresses, that is, the similarity is 3 and is equal to the set number of similarity determinations. Therefore, a corresponding message "arrival today and fresh sliced raw fish" is displayed. In contrast, in rows of item numbers 1 and 3, the number of matched addresses, that is, the similarity is 2 and is less than the set number of similarity determinations. Therefore, no corresponding message is displayed.

FIG. 3 also illustrates an example in which the number of similarity determinations is set to 2. Here, in all of the rows of item numbers 1 to 3, the number of matched addresses, that is, the similarity is 2 and 3 and is equal to or greater than the set number of similarity determinations. Therefore, the corresponding messages "cheap bad", "arrival today and fresh sliced raw fish", and "Italian food is good" are displayed. In this case, it is preferable that the messages be displayed to the user in descending order of the number of matched addresses, that is, similarity. In the example illustrated in FIG. 3, the order of the messages is controlled such that "arrival today and fresh sliced raw fish" in the row in which the number of matched addresses, that is, the similarity is 3 is displayed first.

Figure 4:
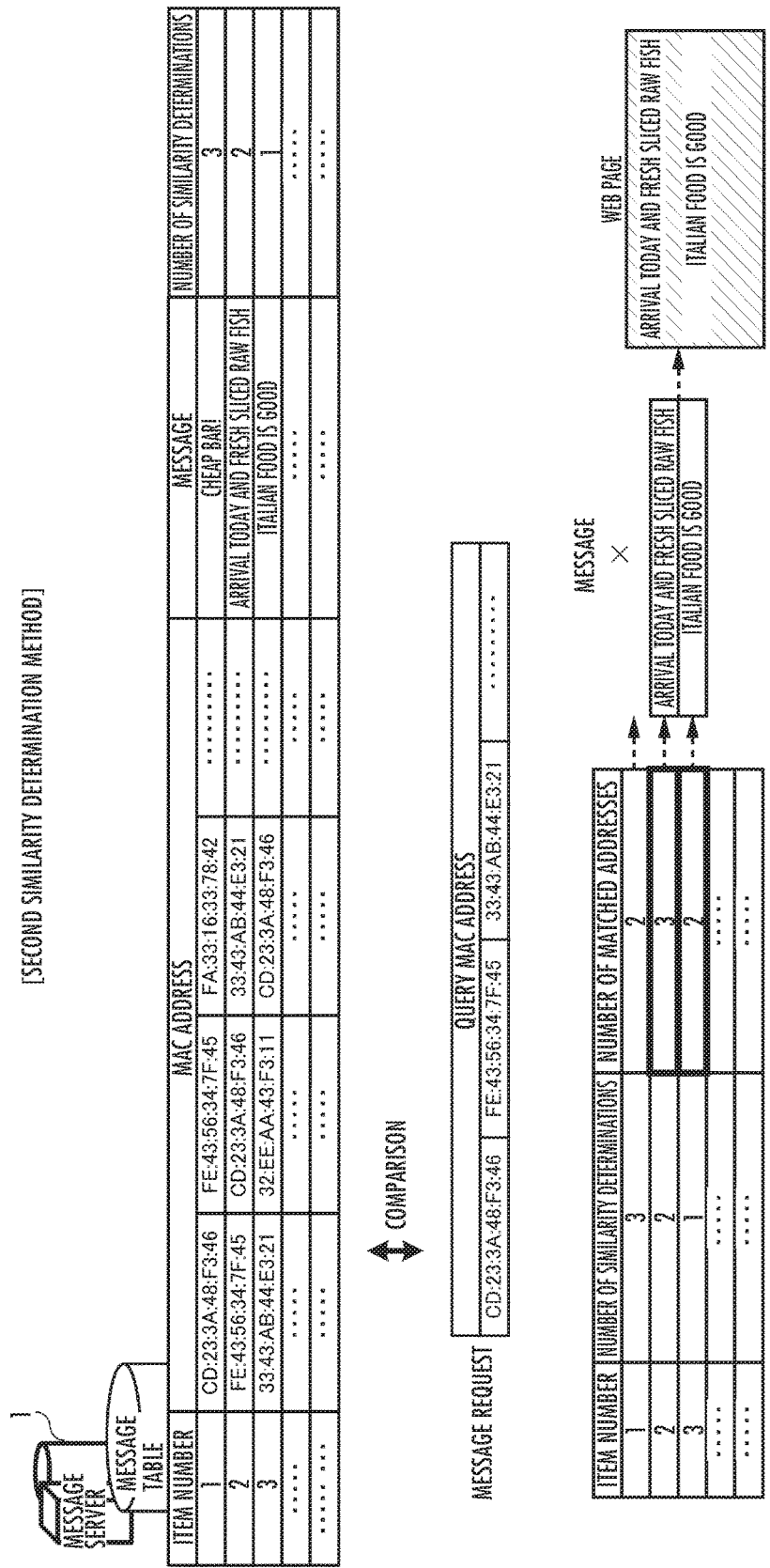
FIG. 4 is a diagram illustrating a second similarity determination method according to the invention.

FIG. 4 is a diagram illustrating a second similarity determination method according to the invention.

<Second Similarity Determination Method>

In the message table, the number of similarity determinations is set for each message. Then, in the above-mentioned Step S13, the message server 1 compares the set of the addresses as the query with the sets of the addresses recorded in the message table and extracts only the message corresponding to the set of the addresses in which the number of matched addresses is equal to or greater than the number of similarity determinations.

As illustrated in FIG. 4, the messages are displayed as follows.

In the row of item number 1, since (the number of matched addresses=2)<(the number of similarity determinations=3) is established, no message is displayed.

In the row of item number 2, since (the number of matched addresses=3) (the number of similarity determinations=2) is established, a message "arrival today and fresh sliced raw fish" is displayed.

In the row of item number 3, since (the number of matched addresses=2) (the number of similarity determinations=1) is established, a message "Italian food is good" is displayed.

The order of the messages is controlled such that the message "arrival today and fresh sliced raw fish" having the largest number of matched addresses is displayed first.

Figure 5:
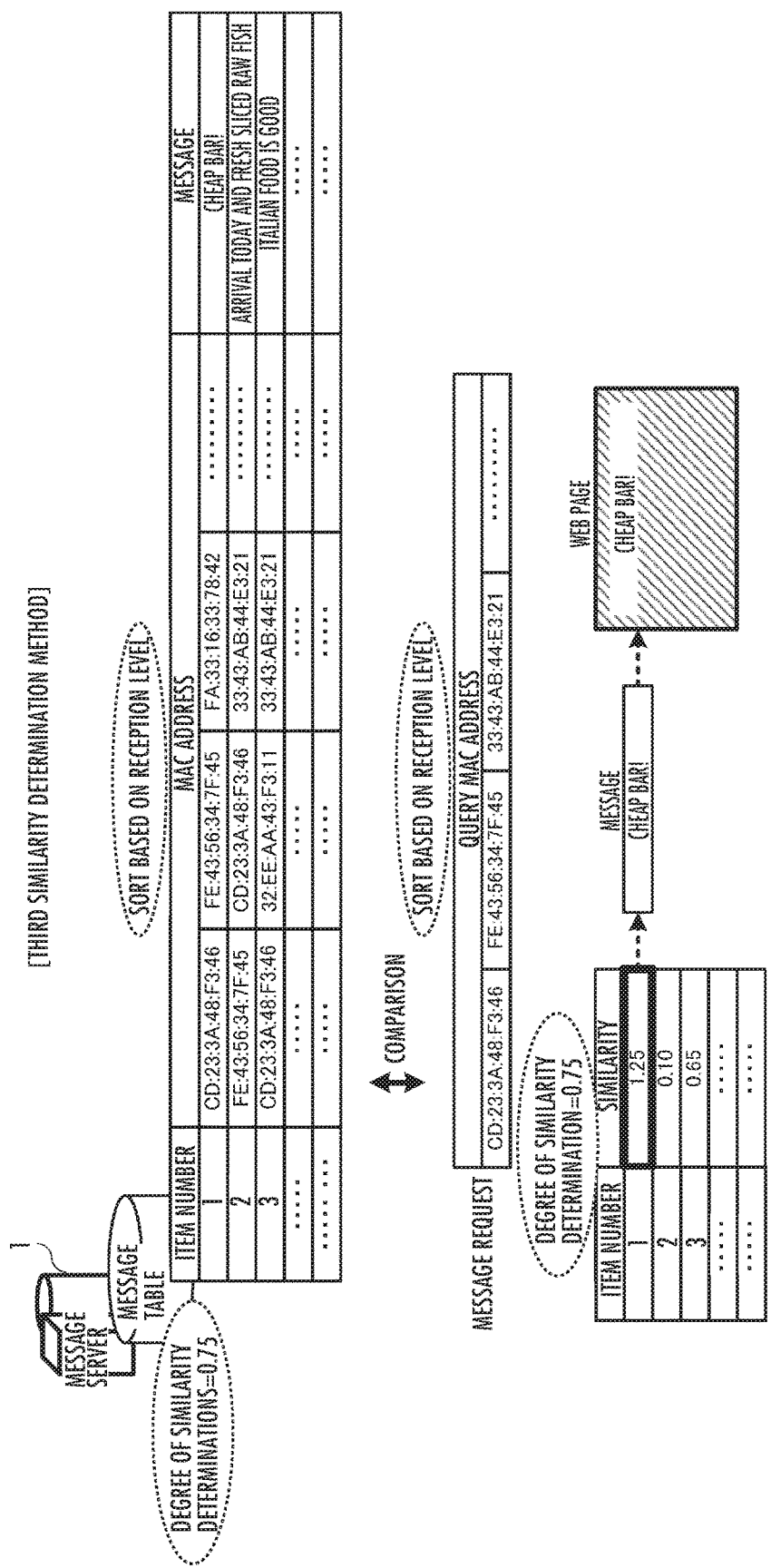
FIG. 5 is a diagram illustrating a third similarity determination method according to the invention.

FIG. 5 is a diagram illustrating a third similarity determination method according to the invention.

<Third Similarity Determination Method>

The message server 1 sets the degree of similarity determination So. Then, in the above-mentioned Step S12, the portable terminal 2 inserts a set of the addresses of a plurality of access points, which is sorted on the basis of a "predetermined condition", into a message acquisition request. Here, the "predetermined condition" may be, for example, the reception level of the annunciation signal (the intensity of a received signal). That is, the descending order of the reception level is generally the increasing order of the distance and is the order of the addresses of the access points close to the portable terminal 2.

(Similarity between Sorted Addresses)

When the number of addresses which are common between the addresses in the message and the addresses in the query is n (at least one address needs to be matched between the addresses in the message and the addresses in the query), a set of the addresses in the message is $a_1$, $a_2$, ..., $a_n$, and a set of the addresses in the query is $q_1$, $q_2$, ..., $q_n$, the order of the addresses is represented as follows:

The order of the addresses in the message: $Ra_1$, $Ra_2$, ..., $Ra_n$; and

The order of the addresses in the query: $Rq_1$, $Rq_2$, ..., $Rq_n$.

Similarity S between the set of the addresses in the query and the set of the addresses in the message table is calculated by the following expression:

$$\text{Similarity: } S = \Sigma_{x=1}^{n} \{1/(1+(Ra_x - Rq_x)^2 \times Ra_x)\}$$

The similarity S is obtained by extracting the difference between the order of the set of the addresses in the message and the order of the addresses in the query and weighting the difference with the order of the addresses in the message.

Then, in the above-mentioned Step S13, the message server 1 extracts only the message in which the similarity S between the set of the addresses in the query and the set of the addresses in the message is equal to or greater than the degree of similarity determination So, which is a predetermined threshold value, that is, S≥So is satisfied.

For example, the messages are extracted as follows:

The degree of similarity determination So=0.75;

The number of addresses which are common between the addresses in the message and the addresses in the query: n=2;

The order of the addresses in the message: Ra=(1, 3, ...);

The order of the addresses in the query: Rq=(1, 4, . . . ); and $$S = \{1/(1 + (1-1)^2 \times 1)\} + \{1/(1 + (3-4)^2 \times 3)\}$$
$$= \{1/(1 + 0 \times 1)\} + \{1/(1+3)\}$$
$$= 1 + 0.25$$
$$= 1.25.$$

In this case, since the similarity S(=1.25) is greater than the degree of similarity determination So (=0.75), the corresponding message is extracted.

(Similarity between Sets of Addresses Sorted Based on Reception Level)

When the number of addresses which are common between the addresses in the message and the addresses in the query is n (at least one address needs to be matched between the addresses in the message and the addresses in the query), a set of the addresses in the message is $a_1$, $a_2$, . . . , $a_n$, and a set of the addresses in the query is $q_1$, $q_2$, . . . , $q_n$, the reception levels of the addresses are represented as follows:

The reception levels of the addresses in the message: $Pa_1$, $Pa_2$, . . . , $Pa_n$; and The reception levels of the addresses in the query: $P_{q1}$, $P_{q2}$, . . . , $P_{qn}$.

The similarity S between the set of the addresses in the query and the set of the addresses in the message table is calculated by the following expression:

Similarity: $S = \sum_{x=1}^{n} \log 10 \operatorname{Exp}(-(Pa_x - Pq_x)^2)/n$.

The similarity S is obtained by extracting the difference in the reception level between the set of the addresses in the message and the set of the addresses in the query and correcting the difference with the number of matched addresses.

For example, the messages are extracted as follows:

The degree of similarity determination So=−15;

The number of addresses which are common between the addresses in the message and the addresses in the query: n=2;

The reception levels of the addresses in the message: Pa=(−40, −45, . . . );

The reception levels of the addresses in the query: Pq=(−40, −50, . . . ); and $$S = \log 10 \operatorname{Exp}(-((-40) - (-40))^2)/2 +$$
$$\log 10 \operatorname{Exp}(-((-45) - (-50))^2)/2$$
$$= (0 - 10.86)/2$$
$$= -5.43.$$

In this case, since the similarity S(=−5.43) is greater than the degree of similarity determination So (=−15), the corresponding messages are extracted.

As illustrated in FIG. 5, the messages are displayed as follows.

For the row of item number 1, since (similarity=1.25)≥ (the degree of similarity determination=0.75) is established, a corresponding message "cheap bar!" is displayed.

For the row of item number 2, since (similarity=0.10)< (the degree of similarity determination=0.75) is established, no corresponding message is displayed.

For the row of item number 3, since (similarity=0.60)< (the degree of similarity determination=0.75) is established, no corresponding message is displayed.

Figure 6:
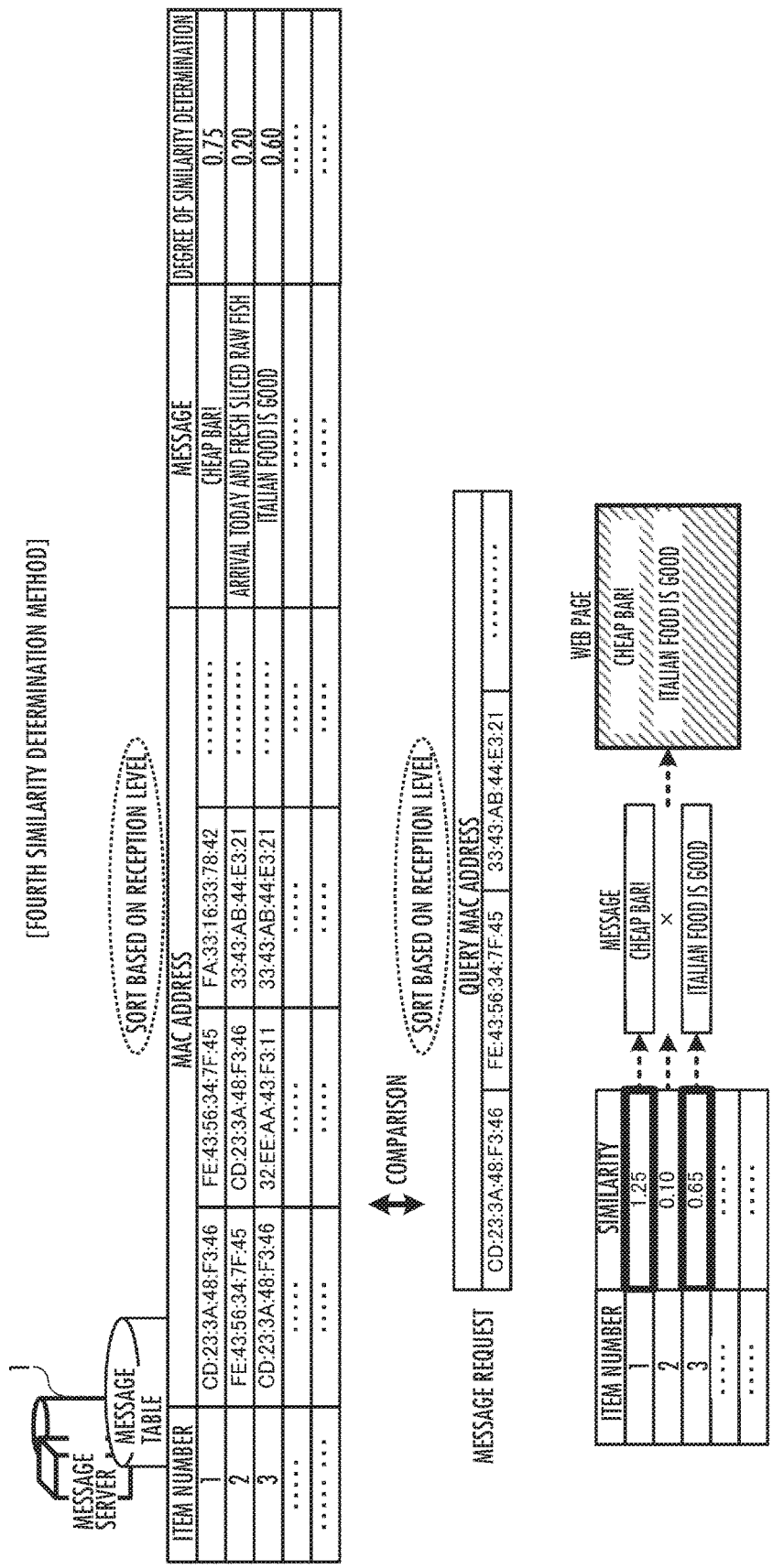
FIG. 6 is a diagram illustrating a fourth similarity determination method according to the invention.

FIG. 6 is a diagram illustrating a fourth similarity determination method according to the invention.

<Fourth Similarity Determination Method>

In the message table, the degree of similarity determination So is set for each message. The fourth similarity determination method is similar to the third similarity determination method except for this setting. In the fourth similarity determination method, the difference in order or reception level between the set of the addresses in the message and the set of the addresses in the query is extracted and corrected with the number of matched addresses.

As illustrated in FIG. 6, the messages are displayed as follows.

For a row of item number 1, since (similarity=1.25)≥(the degree of similarity determination=0.75) is established, a corresponding message "cheap bar!" is displayed.

For a row of item number 2, since (similarity=0.10)<(the degree of similarity determination=0.20) is established, no corresponding message is displayed.

For a row of item number 3, since (similarity=0.65)≥(the degree of similarity determination=0.60) is established, a corresponding message "Italian food is good" is displayed.

Figure 7:
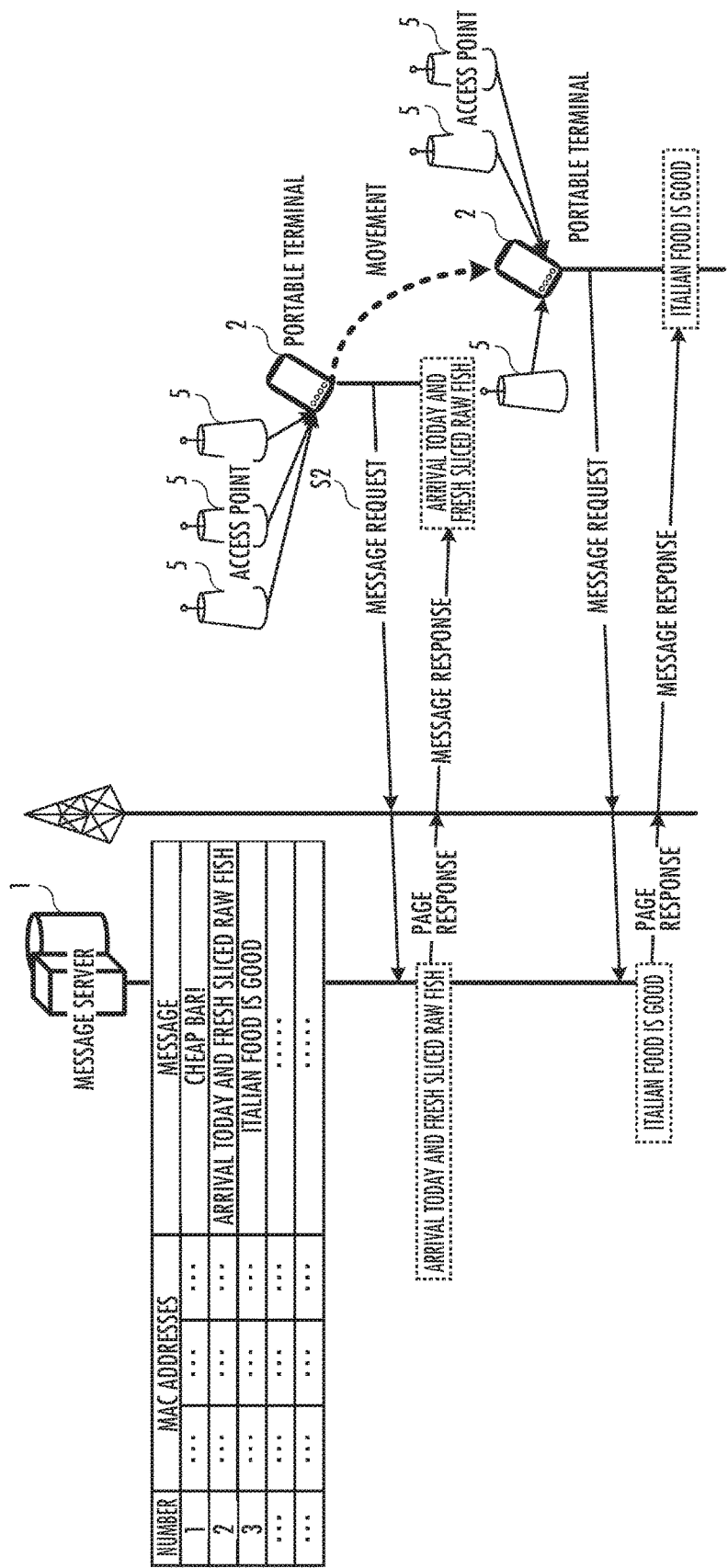
FIG. 7 is a sequence diagram illustrating an example in which different messages are displayed at different positions.

FIG. 7 is a sequence diagram illustrating an example in which different messages are displayed at different positions.

As illustrated in FIG. 7, when the portable terminal 2 is moved, a set of the addresses of the access points received by the portable terminal 2 is changed. The message received from the message server 1 is changed depending on the acquired set of the addresses. That is, the portable terminal 2 can exchange the messages corresponding to the current position on the basis of the current position specified by the set of the addresses of the access points.

Here, two embodiments in which a further message search method is added will be described.

<First Additional Search Method>

In the above-mentioned Step S13, after extracting messages, the message server 1 extracts addresses which are not included in the set of addresses as the query from a set of a plurality of addresses as the search result. Then, the message server 1 selects a set of at least one address from the extracted addresses. Then, the message server 1 further searches for a set of a plurality of addresses recorded in the message table, using the set of addresses as the query, and extracts a message corresponding to the searched set.

For example, it is assumed that the following information is registered in the message table:

The set of addresses (a1, a2, a3, a4, a5)<−> a message A;

The set of addresses (a2, a3, a6, a7, a8)<−> a message B; and

The set of addresses (a7, a8, a9, a10, a11)<−> a message C.

It is assumed that the following set of addresses is included as the query in the message acquisition request:

The set of addresses as the query: (a2, a3, a4).

In this case, when the number of similarity determinations is 2, the messages A and B including some or all of a2, a3, and a4 are transmitted as a response. The message C is not transmitted as a response since it does not include any of a2, a3, and a4.

In the first additional search method, a set of the addresses (a1, a5, a6, a7, a8) which are not included in the set of the addresses (a2, a3, a4) as the query is searched from the messages A and B (a1, a2, a3, a4, a5, a6, a7, a8) which are searched by the set of the addresses (a2, a3, a4) as the query. Then, a set of at least one address is selected from the set of the address (a1, a5, a6, a7, a8) and a search is performed by the same method as that in Step S13. For example, a search is performed again by the same method as that in Step S13, using a selected set of addresses (a7, a8) as the query. Therefore, it is possible to further search for a set of addresses (a7, a8, a9, a10, a11) of the message C. The use of the hop count method makes it possible to further search for a message.

<Second Additional Search Method>

In the above-mentioned step S13, when a message is extracted and a predetermined identifier and character string is added to the message, the message server 1 searches for a message including the character string using the message table and extracts the message.

Here, the predetermined identifier and character string is, for example, a hashtag in Twitter. This is specified by "#(predetermined identifier)+character string". For example, it is assumed that a message including "#Tokyo Station" is registered. When the message is extracted in Step S13, another message including "#Tokyo Station" which is included in the message is further searched. Therefore, it is possible to search for another message according to the content of the message which has been extracted first and then present the searched message to the user.

Figure 8:
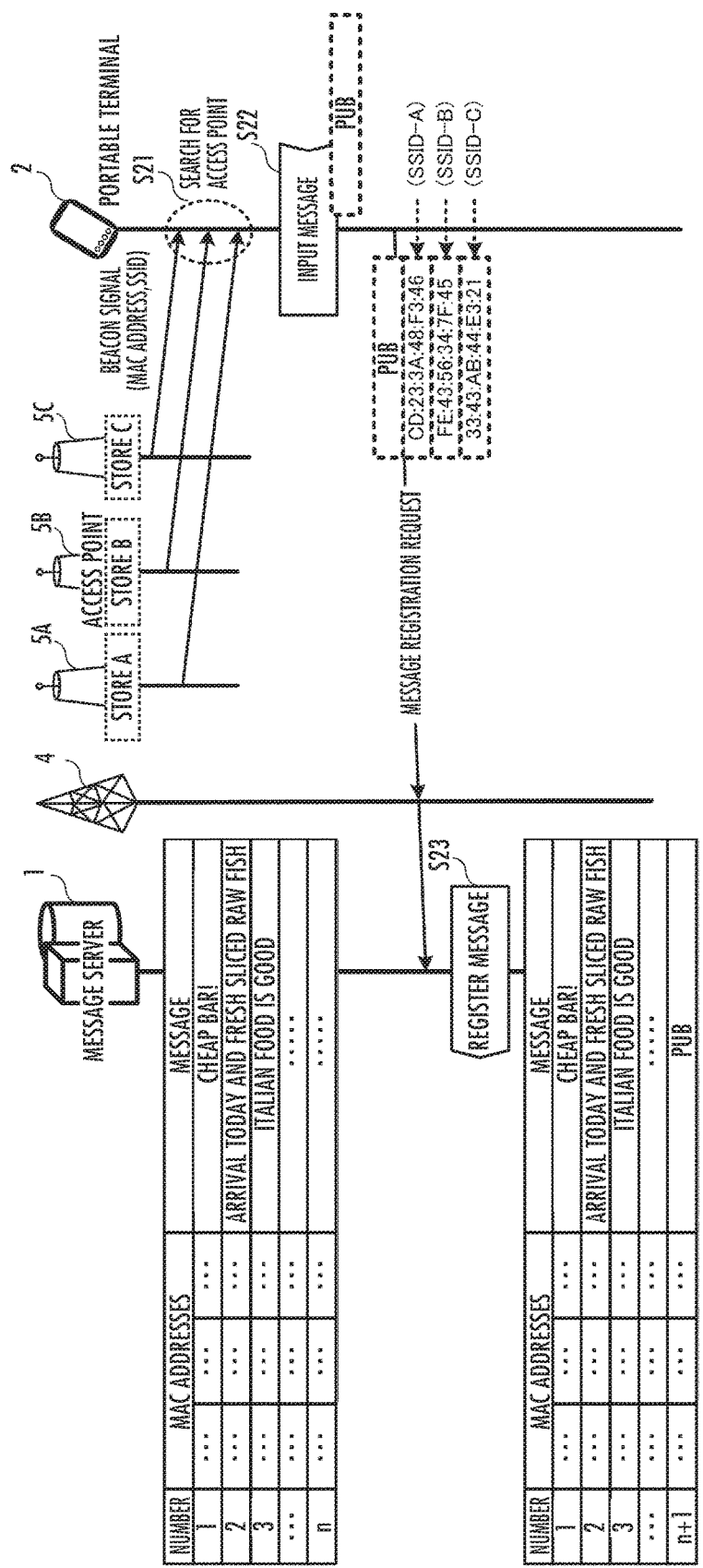
FIG. 8 is a sequence diagram illustrating an embodiment of message registration according to the invention.

FIG. 8 is a sequence diagram illustrating an embodiment of message registration according to the invention.

As illustrated in FIG. 8, messages based on the user or user information are registered in the message table stored in the message server.

(S21) The portable terminal 2 searches for neighboring access points 5 and receives the annunciation signal including the address of the access point from each access point 5.

(S22) The portable terminal 2 transmits, to the message server 1, a message registration request including a set of the addresses of a plurality of access points 5 included in the annunciation signals and the message based on the user or the user information (in FIG. 8, "Pub").

(S23) The message server 1 registers the set of the addresses and the message included in the message registration request in the message table.

<Exclusion of Address>

Next, an embodiment in which a predetermined address is excluded will be described. In the above-described embodiments, in some cases, the addresses registered in the message table and the addresses as the query both include an address to be noise. For example, the address of the access point which is moving is likely to be acquired by chance. Specifically, in some cases, the portable terminals which are located inside and outside a train temporarily acquire the addresses of the access points which are installed inside and outside the train. In order to respond to this situation, it is preferable that the message server 1 register the address, which will be noise, as an excluded address in advance.

For example, in Step S13 illustrated in FIG. 2, the message server 1 uses, as the query, a set of addresses obtained by excluding the excluded address from the set of addresses as the query which is included in the message acquisition request.

For example, in Step S23 illustrated in FIG. 8, the message server 1 registers, in the message table, a set of addresses obtained by excluding the excluded address from the set of a plurality of addresses included in the message acquisition request.

This process makes it possible to prevent the address of the access point which is moving from being included as noise.

Figure 9:
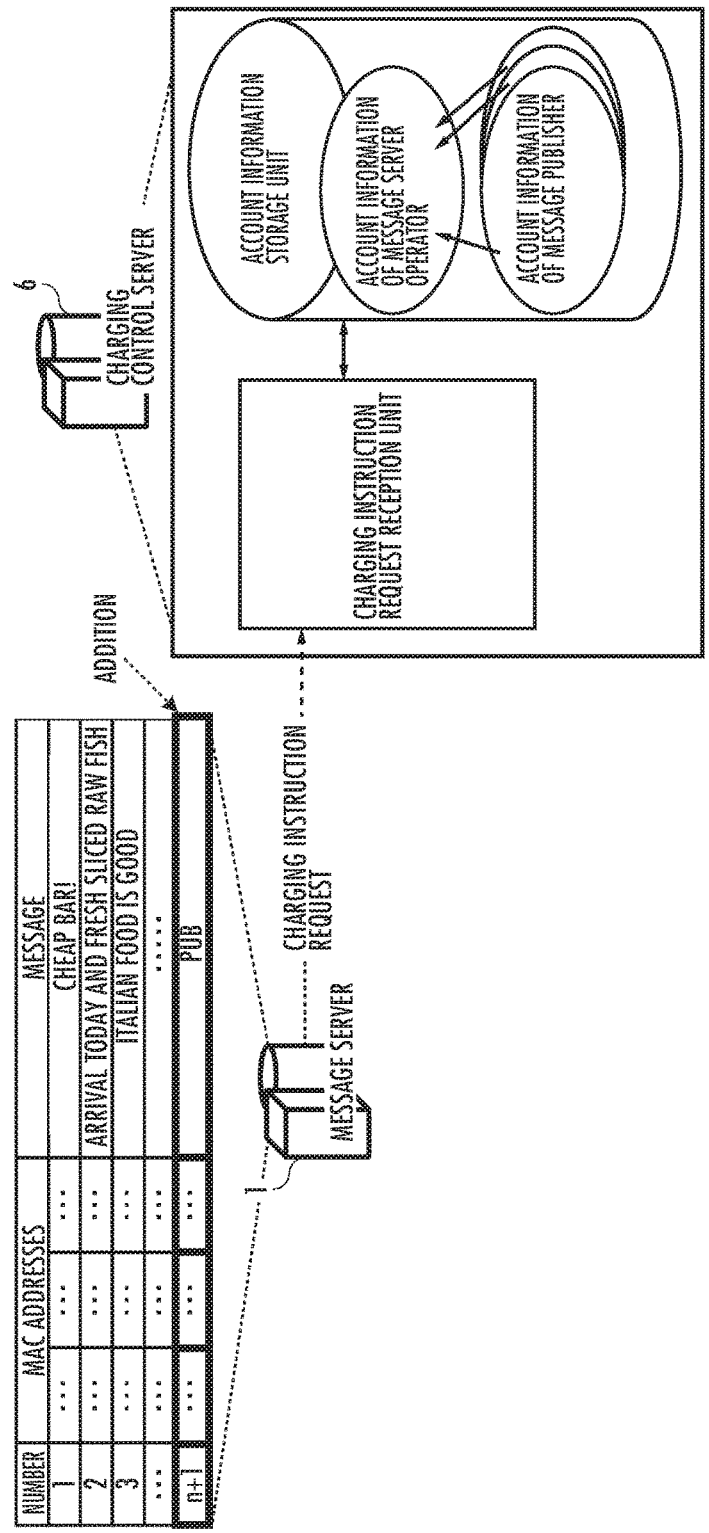
FIG. 9 is a diagram illustrating the function of a charging control server according to the invention.

FIG. 9 is a diagram illustrating the function of the charging control server according to the invention.

The charging control server 6 creates a business model in which the message publisher (for example, storekeeper) pays a predetermined amount of money as an advertisement rate to the message server operator (a service provider in the invention). Hereinafter, two model sequences will be described.

(First Model Sequence)

The portable terminal 2 transmits the message registration request to the message server 1. In this case, the portable terminal 2 transmits a "charging instruction request" to the charging control server 6. The charging instruction request is an instruction to transmit information about a predetermined amount of money from account information about the message publisher to account information about the message server operator.

It is preferable to insert a control code for transmitting the charging instruction request when the HTML source program is generated. For example, it is preferable to insert the control code such that the portable terminal 2 transmits the following URL to the message server 1:

http://www.proxy.com/billing/AAA/PROXY/100

The URL instructs a message server "www.proxy.com" to transmit information about a predetermined amount of money "100 yen" from account information about a message publisher AAA to account information about a message server operator PROXY.

As in the embodiments illustrated in FIGS. 4 and 6 as described above, when "the number of similarity determinations" is set for each message, it is preferable that the predetermined amount of money increase as the number of similarity determinations decreases. In practice, as the number of similarity determinations decreases, the number of addresses to be matched decreases and the possibility that a message, which is a response to the message acquisition request, will be transmitted increases. That is, the possibility of the message being browsed by other users increases. On the other hand, as the number of similarity determinations increases, the number of addresses to be matched increases and the possibility that the message, which is a response to the message acquisition request, will be transmitted decreases. When the possibility that the message will be transmitted as a response increases, it is appropriate to increase the corresponding predetermined amount of money.

(Second Model Sequence)

The portable terminal 2 transmits the message acquisition request to the message server 1 and receives a message as a response. In this case, the message server 1 transmits a "charging instruction request" to the charging control server 6. The charging instruction request is an instruction to transmit information about a predetermined amount of money from account information about the message publisher to account information about the message server operator. That is, the message publisher is charged whenever the message is transmitted as a response to other users.

Figure 10:
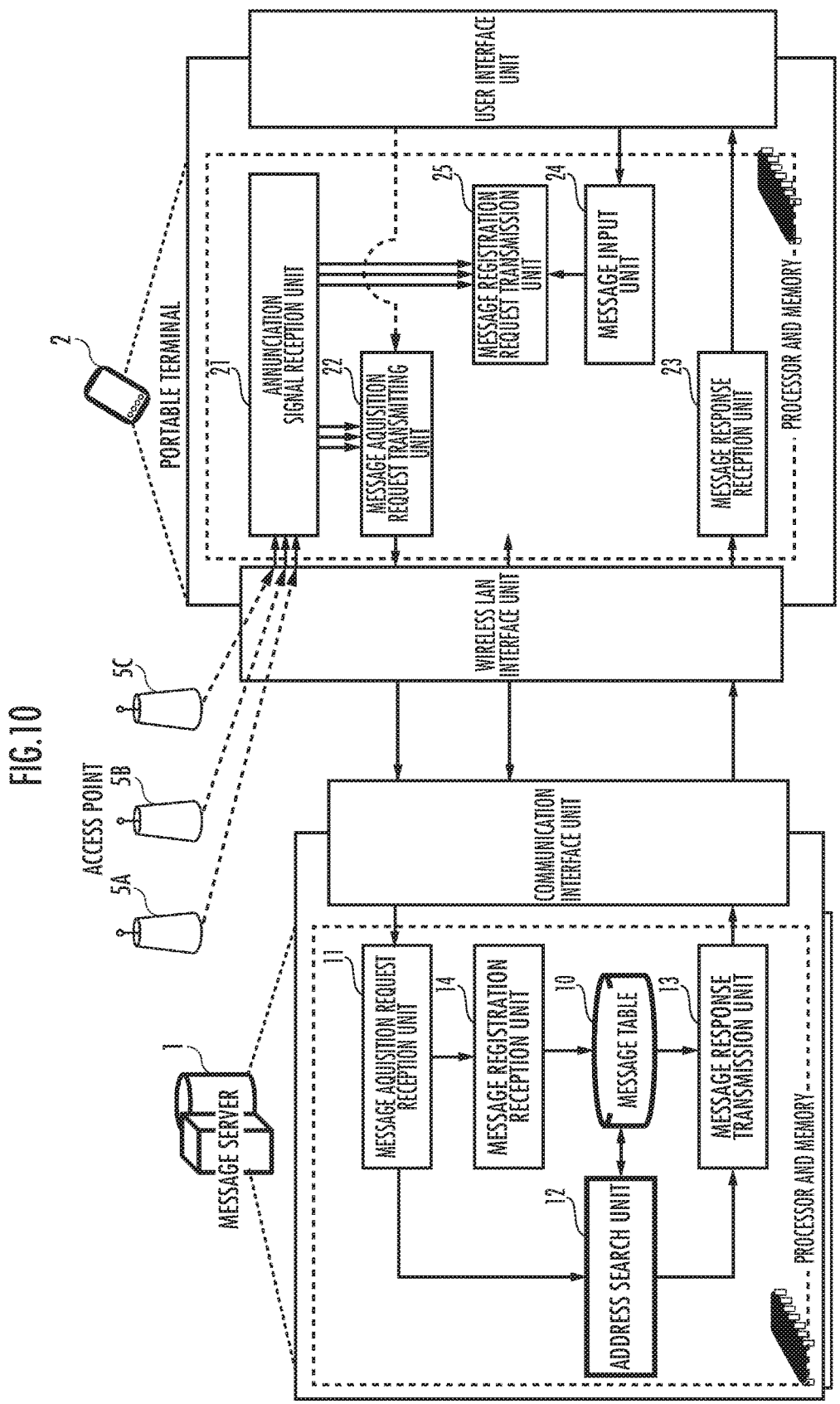
FIG. 10 is a functional diagram illustrating an embodiment of a message server and a portable terminal according to the invention.

FIG. 10 is a functional block diagram illustrating an embodiment of the proxy server and the portable terminal according to the invention.

[Portable Terminal 2]

As illustrated in FIG. 10, the portable terminal 2 includes, as hardware, a wireless LAN interface unit connected to the wireless LAN and a user interface unit such as a touch panel display. In addition, the portable terminal 2 includes an annunciation signal reception unit 21, a message acquisition request transmission unit 22, a message response reception unit 23, a message input unit 24, and a message registration request transmission unit 25. The functional components of the portable terminal 2 except for the wireless LAN interface unit and the user interface unit are implemented by executing a program which causes a computer provided in the portable terminal 2 to operate.

The annunciation signal reception unit 21 searches for the access points which are present in the vicinity of the portable terminal and receives the annunciation signal including the address of the access point from each access point, as illustrated in Step S11 of FIG. 2 and Step 21 of FIG. 8 as described above. The address included in the annunciation signal is output to the message acquisition request transmission unit 22 and the message registration request transmission unit 25.

The message acquisition request transmission unit 22 transmits, to the message server, a message acquisition request which includes, as a query, a set of the addresses of a plurality of access points included in the annunciation signals, as illustrated in the above-mentioned Step S12 of FIG. 2.

The message response reception unit 23 receives a message as a response from the message server 1, as illustrated in the above-mentioned Step S14 of FIG. 2. The received message is rendered and is present to the user through the user interface unit.

The message input unit 24 receives the message based on the user from the user interface unit and outputs the message to the message registration request transmission unit 25.

As illustrated in the above-mentioned Step S22 of FIG. 8, the message registration request transmission unit 25 transmits, to the message server 1, a message registration request including the message based on the user and the set of the addresses of the plurality of access points included in the annunciation signal.

[Message Server 1]

As illustrated in FIG. 10, the message server 1 includes, as hardware, a communication interface unit which is connected to a wide area network such as the Internet. In addition, the message server 1 includes a message table 10, a message acquisition request reception unit 11, an address search unit 12, a message response transmission unit 13, and a message registration reception unit 14. The functional components of the message server 1 except for the communication interface unit are implemented by executing a program that causes a computer provided in the server to operate.

The message table 10 stores messages so as to be associated with each set of the addresses of a plurality of access points.

The message acquisition request reception unit 11 receives a message acquisition request from the portable terminal 2, as illustrated in Step S12 of FIG. 2. Then, the message acquisition request reception unit 11 outputs a set of the addresses included in the message acquisition request as the query to the address search unit 12.

As illustrated in Step S13 of FIG. 2, the address search unit 12 compares the set of the addresses as the query which is included in the message acquisition request with a plurality of sets of addresses recorded in the message table, using the message table 10, and extracts a message corresponding to a set of addresses which ranks high among the sets of addresses which are arranged in descending order of the similarity.

As illustrated in Step S14 of FIG. 2, the message response transmission unit 13 transmits a page including the extracted message as a response to the portable terminal 2.

As illustrated in Step S23 of FIG. 8, the message registration reception unit 14 registers the message and the set of the addresses included in the message registration request in the message table 10.

As described in detail above, according to the method and system of the invention, it is possible to exchange messages only between the users who stay in a predetermined range around the current position, without intentionally grouping the users.

According to the method and system of the invention, the user of the portable terminal can browse various messages transmitted from the access points which are located in the vicinity of the user in increasing order of the distance from the user by performing only the operation of turning on the communication interface of the wireless LAN and searching for neighboring access points. For example, the user can check the acquired messages in such a way of browsing time line messages of Twitter or Facebook.

Those skilled in the art can readily change, modify, and omit the above-described embodiments of the invention, without departing from the technical scope and spirit of the invention. The above-described embodiments are illustrative and the invention is not limited to the above-described embodiments. The invention is limited only by the claims and equivalents thereof.

EXPLANATIONS OF LETTERS OR NUMERALS

1 MESSAGE SERVER
10 MESSAGE TABLE
11 MESSAGE ACQUISITION REQUEST RECEPTION UNIT
12 ADDRESS SEARCH UNIT
13 MESSAGE RESPONSE TRANSMISSION UNIT
14 MESSAGE REGISTRATION RECEPTION UNIT
2 PORTABLE TERMINAL
21 ANNUNCIATION SIGNAL RECEPTION UNIT
22 MESSAGE ACQUISITION REQUEST TRANSMISSION UNIT
23 MESSAGE RESPONSE RECEPTION UNIT
24 MESSAGE INPUT UNIT
25 MESSAGE REGISTRATION REQUEST TRANSMISSION UNIT
3 WEB SERVER
4 CONTRACTED BASE STATION/ACCESS POINT
5 ACCESS POINT
6 CHARGING CONTROL SERVER

The invention claimed is:

1. A method for operating a message exchanging system including a plurality of access points that transmit annunciation signals including their addresses, a portable terminal configured to be connected to a wide area network and to receive the annunciation signals transmitted from the access points, and a message server that is connected to the wide area network and stores a message table in which a message is associated with each set of the addresses of the plurality of access points, in order for the portable terminal to acquire the message from the message server, the method comprising:

a first step, effected though the portable terminal, of searching for access points in a vicinity of the portable terminal and receiving the annunciation signal including the address of the access point from each of searched access points;

a second step, effected though the portable terminal, of transmitting to the message server, a message acquisition request which includes, as a query, a set of the addresses of the searched access points included in the annunciation signals;

a third step, effected though the message server, of comparing the set of the addresses as the query which is included in the message acquisition request, with a plurality of sets of addresses recorded in the message table stored in the message server, and extracting a message corresponding to a set of the addresses which ranks high among the sets of the addresses that are arranged in descending order of similarity; and a fourth step, effected though the message server and the portable terminal, of transmitting the extracted message as a response to the portable terminal such that the portable terminal exchanges messages with other portable terminals which are in a vicinity of the portable terminal.

2. The method according to claim 1,
wherein the message server registers an excluded address in advance, and
in the third step, the message server uses, as a query, a set of the addresses obtained by excluding the excluded address from the set of the addresses as the query which is included in the message acquisition request.

3. The method according to claim 1, further comprising the step of registering a message in the message table of the message server based on an input from the portable terminal, the message registering step involving:
a step, effected though the portable terminal, of searching for the access points in the vicinity of the portable terminal and receiving the annunciation signal including the address of the access point from each access point;
a step, effected though the portable terminal, of transmitting, to the message server, a message registration request including the set of the addresses of the searched access points included in the annunciation signals and the corresponding message based on the input from the portable terminal; and
a step, effected though the message server, of registering the set of the addresses and the corresponding message included in the message registration request in the message table.

4. The method according to claim 3,
wherein the message server registers an excluded address in advance, and
in the step of registering the set of the addresses and the message, the message server registers, in the message table, a set of the addresses obtained by excluding the excluded address from the set of the addresses included in the message registration request.

5. The method according to claim 1,
wherein, in the third step, the message server sorts a plurality of the extracted messages in descending order of the similarity.

6. The method according to claim 1,
wherein the message server sets a number of similarity determinations, and
in the third step, the message server compares the set of the addresses as the query with the sets of the addresses recorded in the message table, uses a number of matched addresses as the similarity, and extracts a message corresponding to the set of the addresses in which the similarity is equal to or greater than the number of similarity determinations among the sets of the addresses which are arranged in descending order of the similarity.

7. The method according to claim 1,
wherein, in the message table, a number of similarity determinations is set for each of the messages, and
in the third step, the message server compares the set of the addresses as the query with the sets of the addresses recorded in the message table and extracts only a message corresponding to the set of the addresses in which a number of matched addresses is equal to or greater than the number of similarity determinations.

8. The method according to claim 7,
wherein the system further includes a charging control server that is connected to the wide area network,
the charging control server manages account information about a publisher transmitting a message registration request from the portable terminal and account information about an operator of the message server,
when receiving the message registration request, the message server transmits, to the charging control server, a charging instruction request to instruct transmission of information about a predetermined amount of money from the account information about the publisher of the portable terminal to the account information about the operator of the message server, and
as the number of similarity determinations set to each message decreases, the predetermined amount of money increases.

9. The method according to claim 1,
wherein the message server sets a degree of similarity determination,
in the second step, the portable terminal inserts the set of the addresses of the plurality of access points which is sorted based a predetermined condition into the message acquisition request, and
in the third step, the message server calculates the similarity based on a difference in order between the set of the addresses as the query and the sets of the addresses recorded in the message table and extracts a message corresponding to the set of the addresses in which the similarity is equal to or greater than the degree of similarity determination.

10. The method according to claim 9,
wherein the predetermined condition is a reception level of the annunciation signal, and
in the third step, the message server calculates the similarity based on a difference in the reception level between the set of the addresses as the query and the sets of the addresses recorded in the message table and extracts only a message corresponding to the set of the addresses in which the similarity is equal to or greater than the degree of similarity determination.

11. The method according to claim 1,
wherein, in the message table, a degree of similarity determination is set for each of the messages,
in the second step, the portable terminal inserts the set of the addresses of the plurality of access points which is sorted based on a predetermined condition into the message acquisition request, and
in the third step, the message server calculates the similarity based on a difference in order between the set of the addresses as the query and the sets of the addresses recorded in the message table and extracts only a message corresponding to the set of the addresses in which the similarity is equal to or greater than the degree of similarity determination.

12. The method according to claim 11,
wherein the predetermined condition is a reception level of the annunciation signal, and
in the third step, the message server calculates the similarity based on a difference in the reception level between the set of the addresses as the query and the sets of the addresses recorded in the message table and extracts only a message corresponding to the set of the addresses in which the similarity is equal to or greater than the degree of similarity determination.

13. The method according to claim 1,
wherein, in the third step, after extracting the message, the message server extracts addresses which are not included in the set of the addresses as the query from a set of a plurality of addresses as the search result, selects a set of at least one address from the extracted addresses, searches for a set of a plurality of addresses recorded in the message table, using the selected set of addresses as the set of the addresses as the query, and extracts a message corresponding to the searched set.

14. The method according to claim 1,
wherein, in the third step, when the message is extracted and a predetermined identifier and character string is added to the extracted message, the message server searches for a message including the character string using the message table and extracts the message.

15. The method according to claim 1,
wherein the address of the access point is a media access control (MAC) address or a service set identifier (SSID).

16. The method according to claim 1,
wherein the message is a text message or media data selected from the group consisting of a uniform resource locator (URL), an image, video, audio, and sensor data, and is based on an input effected through the portable terminal.

17. The method according to claim 1,
wherein the annunciation signal is a beacon signal or a probe response of a wireless local area network (LAN) which is transmitted from the access point, and
a request and a response transmitted between the portable terminal and the message server are based on a hypertext transport protocol (HTTP).

18. The method according to claim 1,
wherein the system further includes a charging control server that is connected to the wide area network,
the charging control server manages account information about a publisher transmitting a message registration request from the portable terminal and account information about an operator of the message server, and
when receiving the message registration request, the message server transmits, to the charging control server, a charging instruction request to instruct transmission of information about a predetermined amount of money from the account information about the publisher of the portable terminal to the account information about the operator of the message server.

19. The method according to claim 1,
wherein the system further includes a charging control server that is connected to the wide area network,
the charging control server manages account information about a publisher transmitting a message registration request from the portable terminal and account information about an operator of the message server, and
when transmitting the message as a response, the message server transmits, to the charging control server, a charging instruction request to instruct transmission of information about a predetermined amount of money from the account information about the publisher of the portable terminal which has registered the message to the account information about the operator of the message server.

20. A message exchange system comprising:
a plurality of access points that transmit annunciation signals including their addresses;
a portable terminal that can be connected to a wide area network and receives the annunciation signals transmitted from the access points; and
a message server that is connected to the wide area network and stores a message table in which a message is associated with each set of the addresses of the plurality of access points,
wherein the portable terminal includes:
an annunciation signal reception element that searches for the access points in a vicinity of the portable terminal and receives the annunciation signal including the address of the access point from each of the searched access points;
a message acquisition request element that transmits, to the message server, a message acquisition request which includes, as a query, the set of the addresses of a plurality of the searched access points included in the annunciation signals; and
a message response reception element that receives the message from the message server and presents the message to a user, and
wherein the message server includes:
a message acquisition request reception element that receives the message acquisition request from the portable terminal;
an address search element that compares the set of the addresses as the query which is included in the message acquisition request with a plurality of sets of addresses recorded in the message table and extracts a message corresponding to a set of the addresses which ranks high among the sets of the addresses that are arranged in descending order of similarity; and
a message response transmission element that transmits the extracted message as a response to the portable terminal.

21. The message exchange system according to claim 20,
wherein, in order to register a message based on the user's input in the message table of the message server,
the portable terminal further includes a message registration request element that transmits, to the message server, a message registration request including the set of the addresses of the plurality of the searched access points included in the annunciation signals and the message based on the user's input, and
the message server further includes a message registration element that registers the set of the addresses and the message included in the message registration request in the message table.

* * * * *